US012662217B2

(12) United States Patent
Fishburn et al.

(10) Patent No.: US 12,662,217 B2
(45) Date of Patent: Jun. 23, 2026

(54) COUPLER FOR ATTACHING AN ACCESSORY TO A BOAT RAIL

(71) Applicant: Polaris Industries Inc., Medina, MN (US)

(72) Inventors: Bradley R. Fishburn, Syracuse, IN (US); Blair A. Donat, Elkhart, IN (US)

(73) Assignee: POLARIS INDUSTRIES, INC., Medina, MN (US)

( * ) Notice: Subject to any disclaimer, the term of this patent is extended or adjusted under 35 U.S.C. 154(b) by 897 days.

(21) Appl. No.: 17/837,798

(22) Filed: Jun. 10, 2022

(65) Prior Publication Data

US 2022/0411021 A1 Dec. 29, 2022

Related U.S. Application Data

(60) Provisional application No. 63/216,347, filed on Jun. 29, 2021.

(51) Int. Cl.
| | |
|---|---|
| *B63B 17/00* | (2006.01) |
| *F16B 5/06* | (2006.01) |
| *F16B 21/09* | (2006.01) |
| *F16B 45/00* | (2006.01) |

(52) U.S. Cl.
CPC .............. *B63B 17/00* (2013.01); *F16B 21/09* (2013.01); *B63B 2017/0054* (2013.01); *F16B 5/0664* (2013.01); *F16B 45/002* (2021.05)

(58) Field of Classification Search
CPC . B63B 17/00; B63B 2017/0054; B63B 59/02; B63B 2059/025; B63B 27/14; B63B 27/146; F16B 5/0036; F16B 5/0664; F16B 12/22; F16B 12/36; F16B 21/09; F16B 45/002
See application file for complete search history.

(56) References Cited

U.S. PATENT DOCUMENTS

| | | | | | |
|---|---|---|---|---|---|
| 219,775 | A | * | 9/1879 | Sniffin ................... | B63H 16/06 |
| | | | | | 440/108 |
| 3,125,316 | A | * | 3/1964 | Wilmhoff ............. | A47G 1/0655 |
| | | | | | 248/221.12 |
| 3,498,410 | A | * | 3/1970 | Storch .................... | B63B 27/14 |
| | | | | | 182/159 |
| 4,145,583 | A | * | 3/1979 | Oshgan ................... | H04M 1/04 |
| | | | | | 381/361 |

(Continued)

OTHER PUBLICATIONS

Pontoon and Deck Boat, DowcoLok Fender Clip: PDB Tested No. 196, Newsletter, Jun. 2016, 10 pages.
Quick Tenders, FOLBE website, copyright 2011; 2 pages.

*Primary Examiner* — Ajay Vasudeva
(74) *Attorney, Agent, or Firm* — SCHWEGMAN LUNDBERG & WOESSNER, P.A.

(57) ABSTRACT

Couplers for attachment to a protrusion extending outward from a portion of a boat is provided. The coupler may comprise a base having an opening adapted to receive the protrusion, the base having a locked position and an unlocked position. The base being translatable along a first direction between the unlocked position and the locked position. The coupler may further comprise a retainer positioned to hold the base in the locked position; and an accessory support extending outward from the base in a second direction angled relative to the first direction.

21 Claims, 9 Drawing Sheets

(56) References Cited

U.S. PATENT DOCUMENTS

| 4,993,127 | A  * | 2/1991 | Mechem | G10G 5/005 |
| | | | | 24/324 |
| 7,013,823 | B1 * | 3/2006 | Daugherty | B63B 45/00 |
| | | | | 114/252 |
| 7,045,694 | B2 * | 5/2006 | Yasunori | G10G 5/005 |
| | | | | 24/633 |
| 7,781,656 | B2 * | 8/2010 | Furuta | G10G 5/005 |
| | | | | 224/257 |
| 7,918,176 | B2 | 4/2011 | Simard | |
| 8,616,511 | B2 | 12/2013 | James | |
| 9,365,268 | B1 | 6/2016 | Paccoud | |

* cited by examiner

200

| Positioning a Coupler onto a Protrusion of the boat, the Coupler Having a Base, an Aperture for Receiving the Protrusion, a Retainer to Hold Base in a Locked Position and an Accessory Support | —202 |

| Translating the Coupler in a First Direction Until Reaching the Locked Position | —204 |

| Actuating the Retainer to Secure the Locked Position | —206 |

COUPLER FOR ATTACHING AN ACCESSORY TO A BOAT RAIL

CROSS-REFERENCE TO RELATED APPLICATION

The present application claims priority to U.S. Provisional Patent Application No. 63/216,347, filed on Jun. 29, 2021, the entire disclosure of which is incorporated herein by reference.

FIELD OF THE DISCLOSURE

The present invention relates generally to a coupler for attaching an accessory to a pontoon boat and methods of use of a coupler for attaching an accessory to a pontoon boat.

BACKGROUND OF THE DISCLOSURE

It is beneficial to those operating a pontoon boat to have an attachment to the pontoon boat rail for supporting accessories, such as a fender. The fender is typically positioned adjacent the outer side of the boat in order to protect the boat from potential damage after contact with a dock and/or other nearby boats. Currently, there exists clips that are able to clip onto a rail or wall of the boat and allow for attachment through a rope from the clip to the fender. Often times, the clip comprises an opening configured for the attachment of the rope directly to the clip. In many instances, the rail or wall is adjacent furniture such as chairs and cushions, so the clip may come into contact with the furniture during application, removal, or operation of the clip. Depending on the material of the clip and the furniture, the contact between the elements can cause damage.

SUMMARY OF THE DISCLOSURE

In an exemplary embodiment of the present disclosure, a coupler for attachment to a protrusion extending outward from a portion of a boat is provided. The coupler comprising: a base having an opening adapted to receive the protrusion, the base having a locked position and an unlocked position, the base being translatable along a first direction between the unlocked position and the locked position; a retainer positioned to hold the base in the locked position; and an accessory support extending outward from the base in a second direction angled relative to the first direction.

In an example thereof, the portion of the boat has a longitudinal axis and the first direction is parallel to the longitudinal axis.

In another example thereof, the portion of the boat is a rail supported on a horizontally extending a deck and horizontally positioned between an edge of the deck and furniture supported on the deck.

In a further example thereof, the coupler further comprises an adapter positioned between the base and the rail.

In yet another example thereof, the accessory support includes a receiver which is adapted to retain an accessory. In a variation thereof, the accessory is a fender.

In still another example thereof, the retainer is composed of a handle and a ridge for securing the base in the locked position.

In yet still another example thereof, the retainer is hinged relative to the base of the coupler.

In yet a further example thereof, the second direction is angled relative to the first direction in a horizontal plane. In a variation thereof, the second direction is perpendicular to the first direction.

In a further still example thereof, the opening of the base comprises a first portion and a second portion, the first portion being larger than the second portion.

In yet a further still example thereof, the base and the retainer are integrally formed.

In another exemplary embodiment of the present disclosure, a coupler for attachment to a contoured rail of a boat having a longitudinal axis is provided. The coupler comprising: a base positioned on the contoured rail; a support assembly extending outward from the base; a handle hinged relative to the base such that the handle is pivotable with respect to the base; and wherein the coupler attaches to an adapter positioned on the contoured rail.

In an example thereof, the base has a locked position and an unlocked position.

In another example thereof, the base is translatable in a first direction between the locked and unlocked position, the first direction being parallel to the longitudinal axis.

In a further example thereof, the base comprises an aperture for receiving a protrusion for securing the coupler to the rail of the boat.

In yet another example thereof, the adapter comprises a curved portion that conforms to the contoured rail providing a flat surface for attachment to the coupler.

In a further exemplary embodiment of the present disclosure, a method of using a coupler for supporting an accessory is provided. The method comprising: positioning a coupler onto a protrusion of the boat, the coupler having a base moveable between a locked position relative to the rail and an unlocked position relative to the rail, a retainer to hold the base in the locked position, and an accessory support; moving the coupler in a first direction to position the base in the locked position relative to the rail; and actuating the retainer of the coupler to secure the locked position.

In an example thereof, the step of moving the coupler includes translating the coupler in the first direction.

In another example thereof, the protrusion is coupled to a rail of the boat, the rail being positioned adjacent to at least one piece of furniture. In a variation thereof, the movement of the coupler to position the base in the locked position relative to the rail without the coupler contacting the at least one piece of furniture.

In a further example thereof, the step of positioning the coupler onto the protrusion includes receiving the protrusion in an aperture. In a variation thereof, positioning the coupler further comprises aligning the aperture of the base with an opening of the rail and an opening of the protrusion.

In a further still example thereof, the method further comprising attaching an accessory to the accessory support of the coupler.

In still another example thereof, prior to attaching an accessory, the accessory support is removed and replaced with an alternate accessory support.

In yet another example thereof, the retainer comprises a handle hinged relative to the base. In a variation thereof, before translating the coupler, the method comprises moving the handle in a third direction to allow movement of the coupler.

In still a further example thereof, after positioning of the coupler onto the protrusion and aligning the aperture with the opening of the rail, the method further comprises inserting a securing element through the protrusion and through the opening of the rail.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
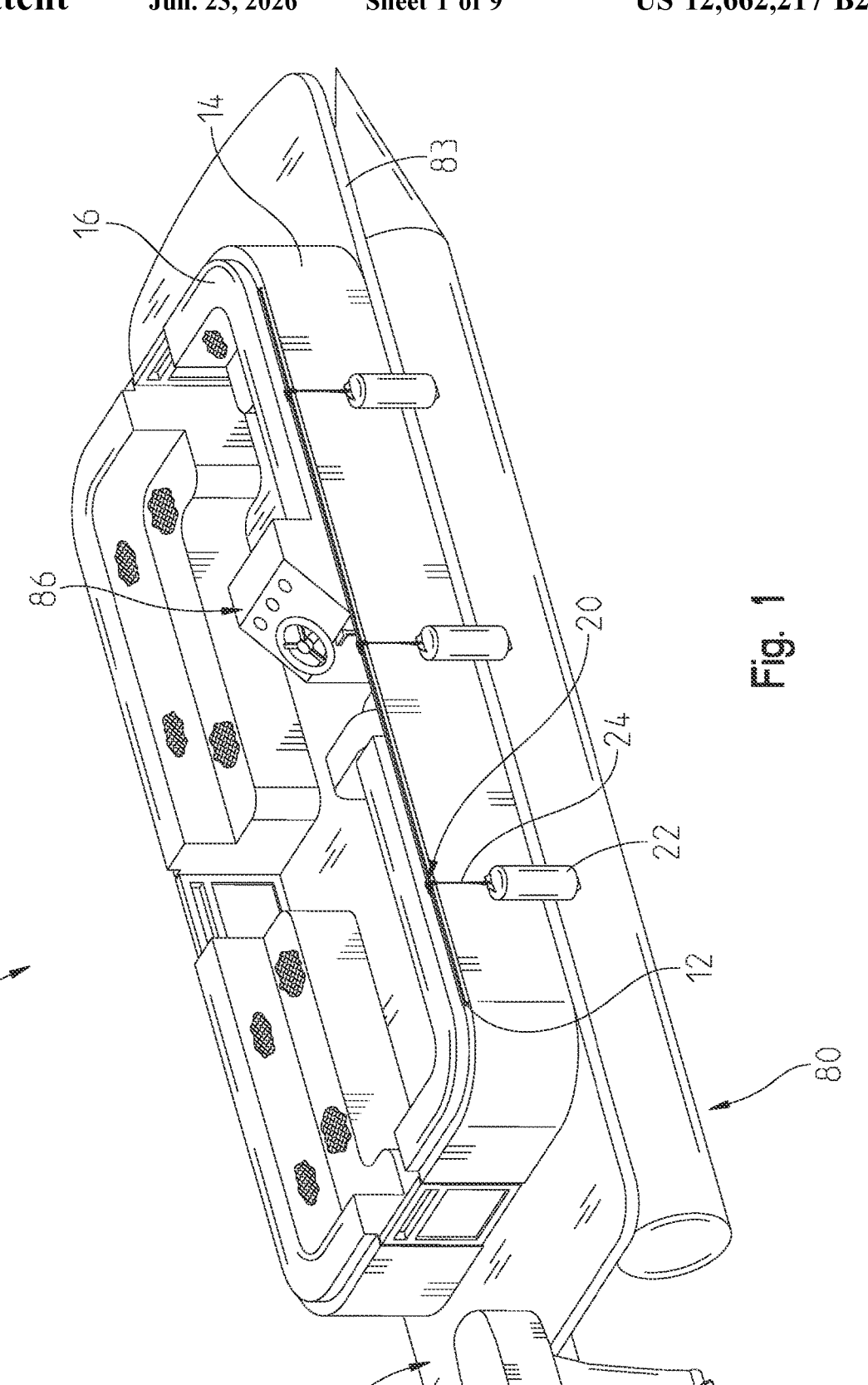
FIG. 1 is a perspective view of a pontoon boat of the present disclosure.

FIG. 1 is a perspective view of a pontoon boat 10. Pontoon boat 10 includes a plurality of pontoons 80, illustratively two, and a deck 82 supported by the plurality of pontoons 80. Deck 82 is generally horizontally extending and has a peripheral edge 83. A motor 84 powers movement of pontoon boat 10 over water. The control of motor 84 for both movement and steering is controlled from an operator station 86 supported by deck 82.

Pontoon boat 10 further comprises a rail 12 with a coupler 20 positioned on rail 12. Rail 12 is positioned generally along a wall 14 of boat 10 along a portion of a perimeter of boat 10. In embodiments, rail 12 may be positioned along an entire perimeter of boat 10. Additionally, rail 12 may be positioned a spacing above or outward from wall 14. Boat 10 may further include furniture 16 positioned within boat 10, such as cushions or seating. Thus, at least a portion of rail 12 may be positioned directly adjacent furniture 16 of boat 10. Rail 12 further comprises at least one coupler 20 positioned on a top surface of rail 12. In embodiments, coupler 20 may be coupled to another surface of rail 12, deck 82, wall 14, or other portions of pontoon boat 10. In the illustrated embodiment, coupler 20 holds an accessory, illustratively a fender 22, through the use of a rope 24 attached to coupler 20 and fender 22. In embodiments, coupler 20 may be used to couple other types of accessories.

Figure 2:
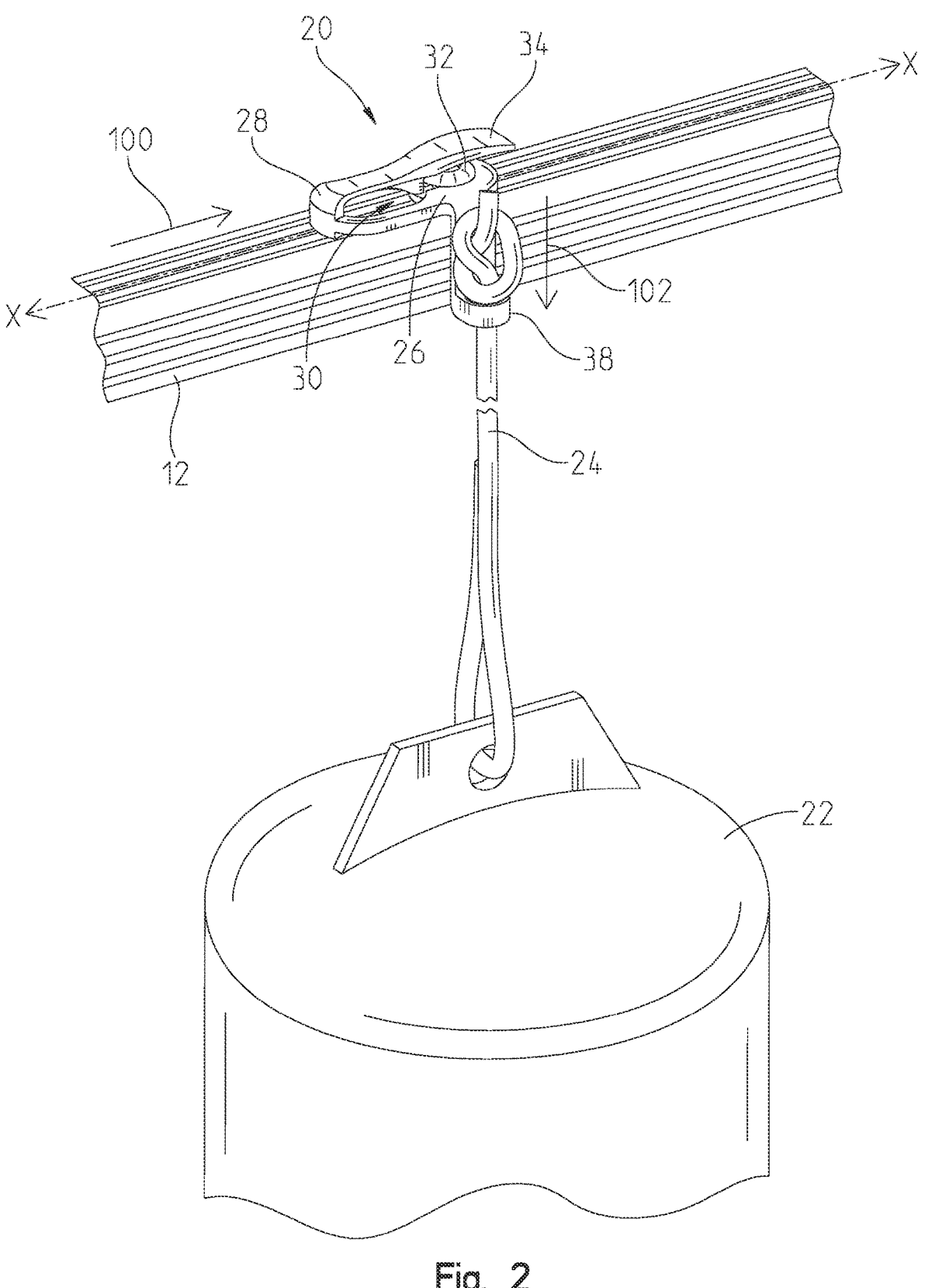
FIG. 2 is a perspective view of a coupler supporting a fender of the present disclosure.

FIG. 2 is a perspective view of coupler 20 of FIG. 1 positioned on rail 12 of boat 10. Rail 12 of boat 10 comprises a longitudinal axis X. Coupler 20 includes a base 26 having an aperture 30 adapted to receive a protrusion 32. Base 26 is further translatable along a first direction 100 between an unlocked position and a locked position. First direction 100 is parallel to longitudinal axis X. In embodiments, first direction 100 is angled relative to longitudinal axis X. In the illustrative embodiment of FIG. 2, coupler 20 is in the locked position, the locked position being defined by the retention of protrusion 32 within base 26. Coupler 20 includes a retainer 28 for maintaining the locked position. Retainer 28 is comprised of a handle 34 and a ridge 36. Handle 34 is hinged relatively to base 26 of coupler 20, and ridge 36 is configured for supporting retention of protrusion 32 within aperture 30 through blocking coupler 20 from sliding in a direction directly opposing first direction 100.

Coupler 20 further comprises an accessory support 38. Accessory support 38 extends outward from base 26 of coupler 20 in a second direction 102 that is angled relative to first direction 100. In embodiments, second direction 102 is angled between about 45 degrees and 90 degrees relative to first direction 100. In embodiments, second direction 102 is approximately angled about 90 degrees relative to first direction 100. In embodiments, second direction 102 is perpendicular relative to first direction 100. The ability of the accessory support 38 and an accessory to be supported along second direction 102 while protrusion 32 is secured on rail 12 may cause the weight of the accessory to be distributed onto coupler 20 rather than entirely on accessory support 38 or entirely on base 26. Accessory support 38 comprises a receiver, illustratively a circular opening 40 (FIG. 3), through which rope 24 attached to fender 22 can be positioned through and secured within. A height of rope 24 can be adjusted which allows for fender 22 to be positioned at a desired height against the side of boat 10. In embodiments, accessory support 38 may be removable from coupler 20 and can be detached and replaced with alternative accessory support, as will be described further with reference to FIGS. 10 and 11.

Figure 3:
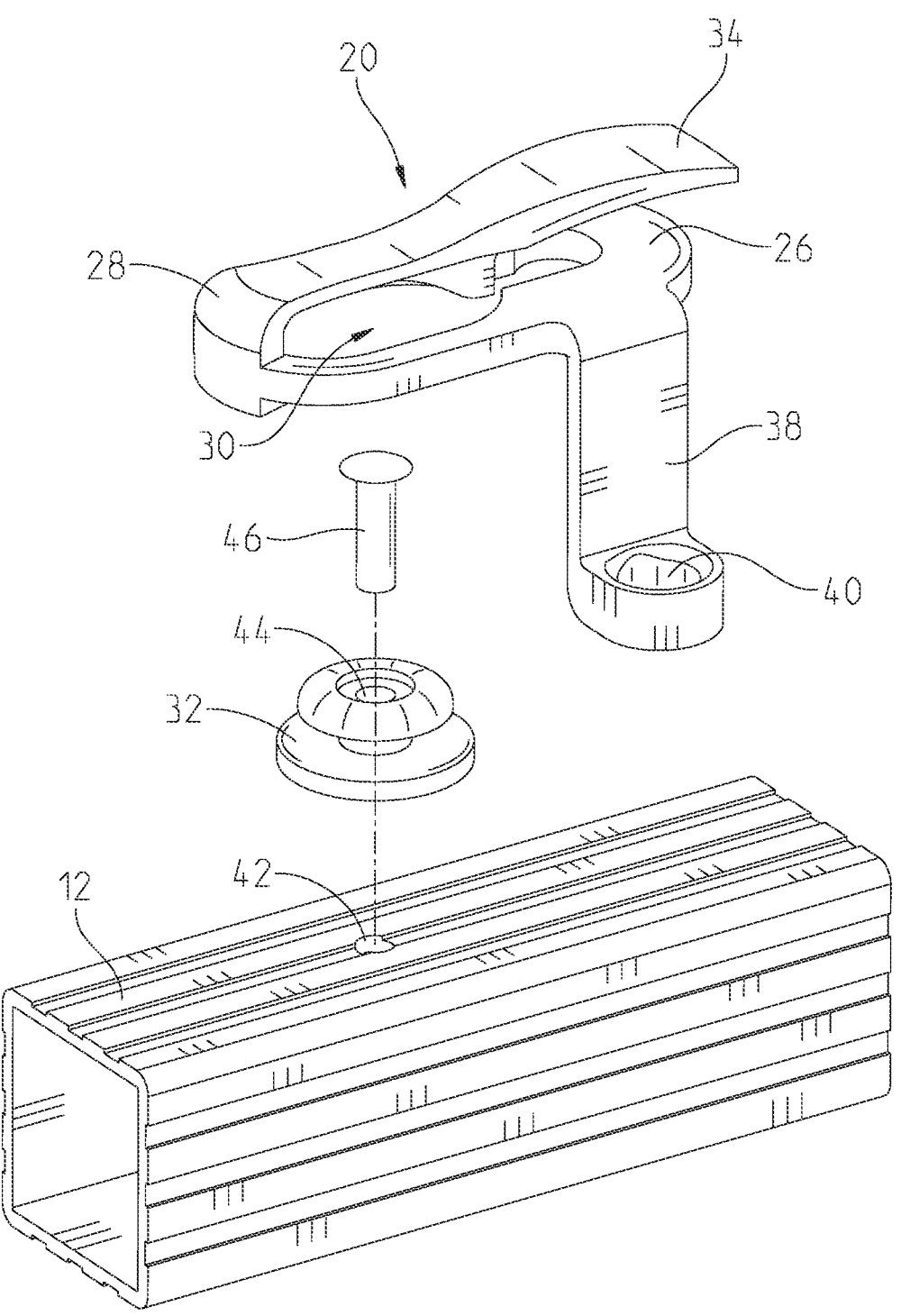
FIG. 3 is an expanded view of a coupler of the present disclosure.

FIG. 3 is an expanded view of coupler 20 of FIG. 2 before positioning on rail 12. In this embodiment, rail 12 further comprises an opening 42. Protrusion 32 comprises an opening 44 that aligns with opening 42 of rail 12 when protrusion 32 is placed onto rail 12. The alignment of protrusion 42 with rail 12 is secured with a securing element 46. Securing element 46 may be at least one of a nut, bolt, and screw. Securing element 46 is inserted into both opening 44 of protrusion 32 and opening 42 of rail 12. In alternative embodiments, protrusion 32 is an integral portion of rail 12 and does not detach from rail 12. In these embodiments, securing element 46 may be omitted and protrusion 32 may not comprise opening 44. In embodiments, coupler 20 may be mounted to a side of rail 12, deck 82, wall 14, or other portions boat 10.

Figure 4:
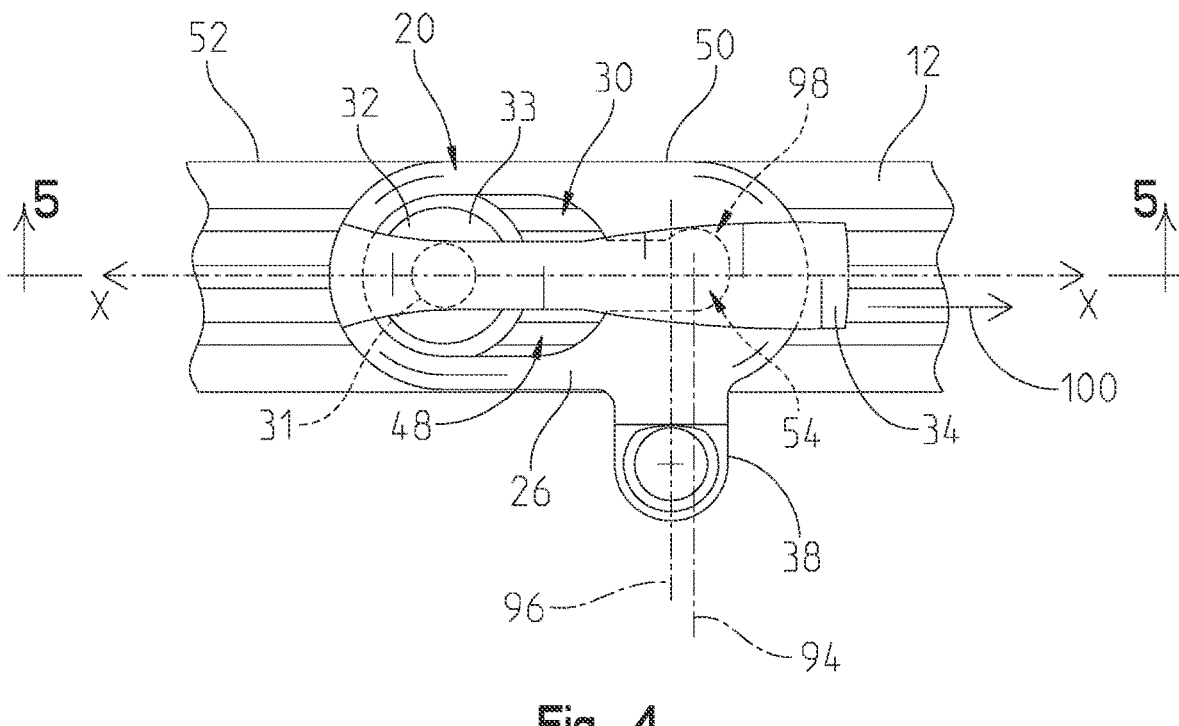
FIG. 4 is a top perspective view of a coupler in an unlocked position of the present disclosure.

FIG. 4 is a top view of coupler 20 positioned on rail 12 in the unlocked position. The unlocked position is defined by protrusion 32 being received within a first portion 48 of aperture 30, which is comparatively larger than a second portion 54 of aperture 30. Coupler 20 is positioned such that longitudinal axis X of rail 12 is parallel with first direction 100. As illustrated in the embodiment of FIG. 4, coupler 20 has a first side 50 that is positioned directly aligned with an inner side 52 of rail 12. Inner side 52 of rail 12 is positioned such that is generally adjacent an inner area of boat 10 (FIG. 1) and may be in contact with furniture 16 (FIG. 1) of boat 10. In this way, when coupler 20 is positioned on rail 12, coupler 20 does not protrude extensively outward from inner side 52 of rail 12, and thus does not protrude into furniture 16. Additionally, the translation from the unlocked position to the locked position occurs along first direction 100. Thus, during the unlocking or locking of coupler 20, coupler 20 does not protrude into furniture 16 of boat 10.

Figure 5:
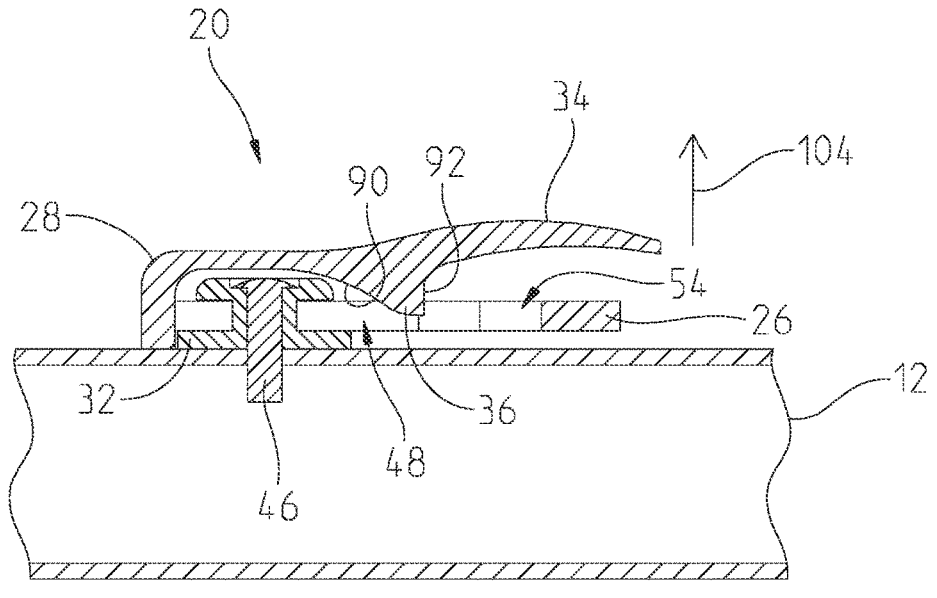
FIG. 5 is a side cross-sectional view through lines 5-5 of the coupler of FIG. 4 of the present disclosure.

FIG. 5 is a side cross sectional view of coupler 20 through lines 5-5 of FIG. 4. Coupler 20 is positioned such that protrusion 32 is within first portion 48 of aperture 30. Ridge 36 of coupler 20 is positioned relatively between first portion 48 and second portion 54 of aperture 30. As previously noted, retainer 28 of coupler 20 is hinged relative to base 26. In embodiments, retainer 28 and base 26 are integrally formed. Retainer 28 may be hinged relative to base 26 in a third direction 104. Third direction 104 may be generally orthogonal to longitudinal axis X of the rail 12. Third direction 104 may be angled relative to the longitudinal axis X at an angle ranging between about 45 degrees to about 90 degrees. In this way, handle 34 of retainer 28 can be actuated generally upwards to at least a point wherein ridge 36 is positioned above protrusion 32. In the illustrated embodiment, retainer 28 has a cam surface 90 which due to contact with protrusion 32 results in handle 34 being actuated upward as coupler 20 is moved from first portion 48 of aperture 30 to second portion 54 of aperture 30. Coupler 20 is then able to translate in first direction 100 such that protrusion 32 is received within second portion 54 of aperture 30. Further, as illustrated in FIG. 5, coupler 20 has a relatively low profile to avoid any interference with additional boat accessories, such as a pontoon cover.

Figure 6:
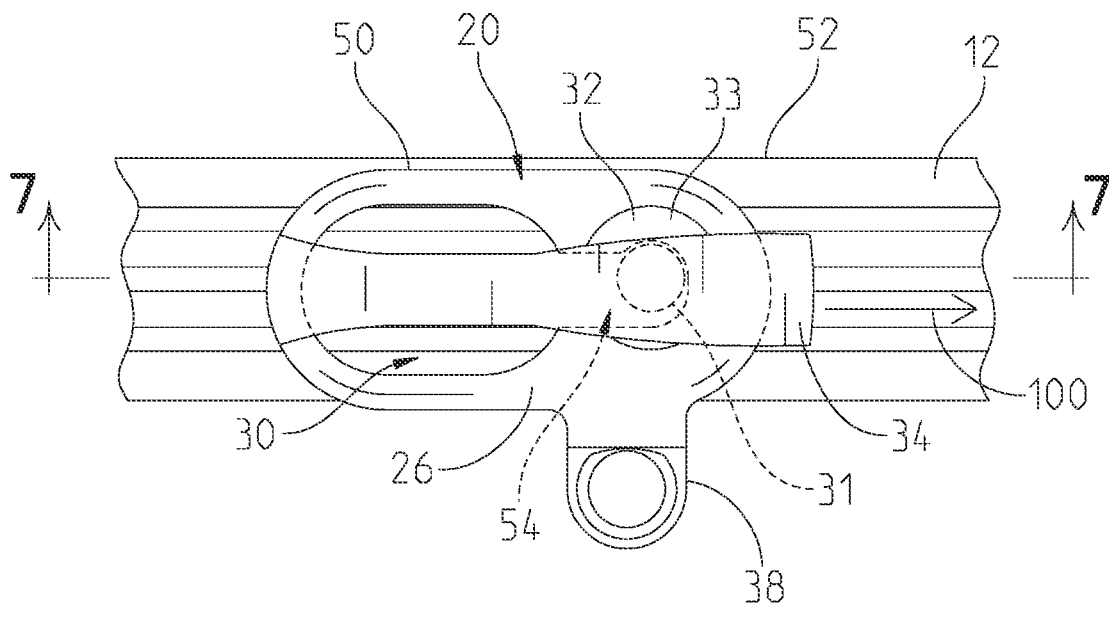
FIG. 6 is a top perspective view of a coupler in a locked position of the present disclosure.

FIG. 6 is a top perspective view of coupler 20 of FIG. 4, but in the locked position. The locked position is defined by protrusion 32 being positioned within second portion 54 of aperture 30 and ridge 36 positioned adjacent protrusion 32. As previously described with reference to FIG. 5, coupler 20 is translated in direction 100 to move from the unlocked position illustrated in FIGS. 4 and 5, to the locked position in FIG. 6. Similar to the illustrative embodiment of FIG. 4 inner side 52 of rail 12 is approximately aligned with first side 50 of rail 12 such that coupler 20 will not protrude outward from inner side 52 into any furniture 16 (FIG. 1) of boat 10.

Figure 7:
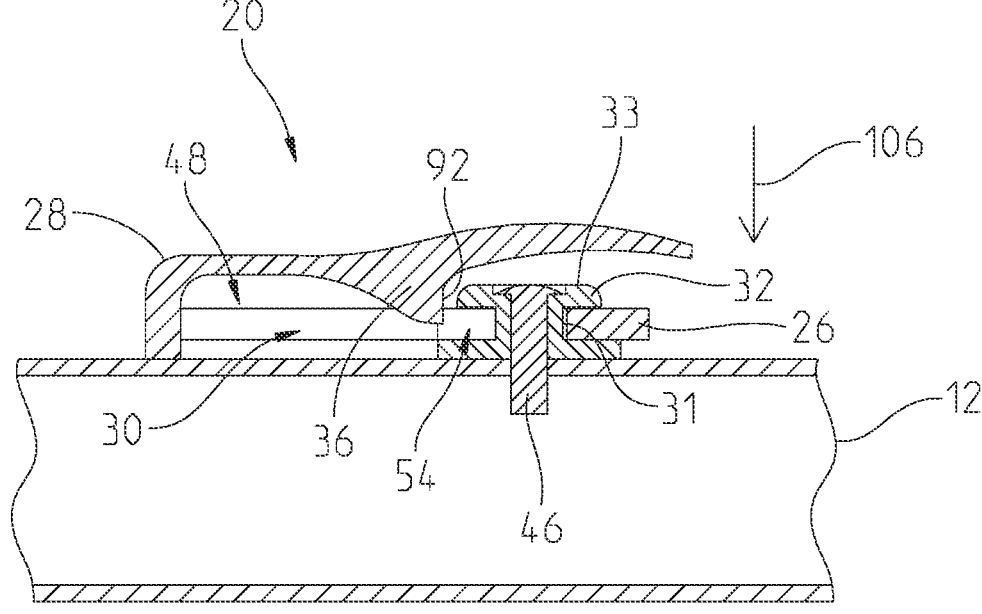
FIG. 7 is a side cross-sectional view through lines 6-6 of FIG. 6 of the present disclosure.

FIG. 7 is a side sectional view of coupler 20 taken along the line 7-7 in FIG. 6. The protrusion 32 is illustrated in second portion 54 of aperture 30. Protrusion 32 comprises a cap 31 and post 33. Cap 31 overlaps a portion of base 26 to retain coupler 20 from being lifted off of rail 12. Post 31 is received in second portion 54 of aperture 30. When coupler 20 is translated to move from the unlocked position to the locked position, coupler 20 is translated until post 33 engages base 26. Handle 34 can then be released and will move in a fourth direction 106 which is generally opposite third direction 104, until ridge 36 is positioned adjacent cap 33 of protrusion 32. Ridge 36 includes a stop 92 which engages cap 33 of protrusion 32 to prevent coupler from moving back to the unlock position of FIG. 5 without first lifting on handle 34 in direction 104.

In the illustrative embodiment of FIG. 7, protrusion 32 is secured to rail 12 through the use of securing element 46 as previously described with reference to FIG. 3. In other embodiments, protrusion 32 may be an integral part of rail 12 and thus may not require securing element 46 to maintain protrusion 32 positioning onto rail 12.

Returning to FIG. 4, a center 94 of second portion 54 of aperture 30 is positioned to the right of a center 96 of accessory support 38 in the view of FIG. 4. Further, second portion 54 includes a recess portion 98 which receives post 31 of protrusion 32 when an accessory is attached to accessory support 38. These features further enhance the retention of post 31 of protrusion 32 in second portion 54 of aperture 30 instead of cap 33 of protrusion 32 pressing against stop 92 of ridge 36.

Figure 8:
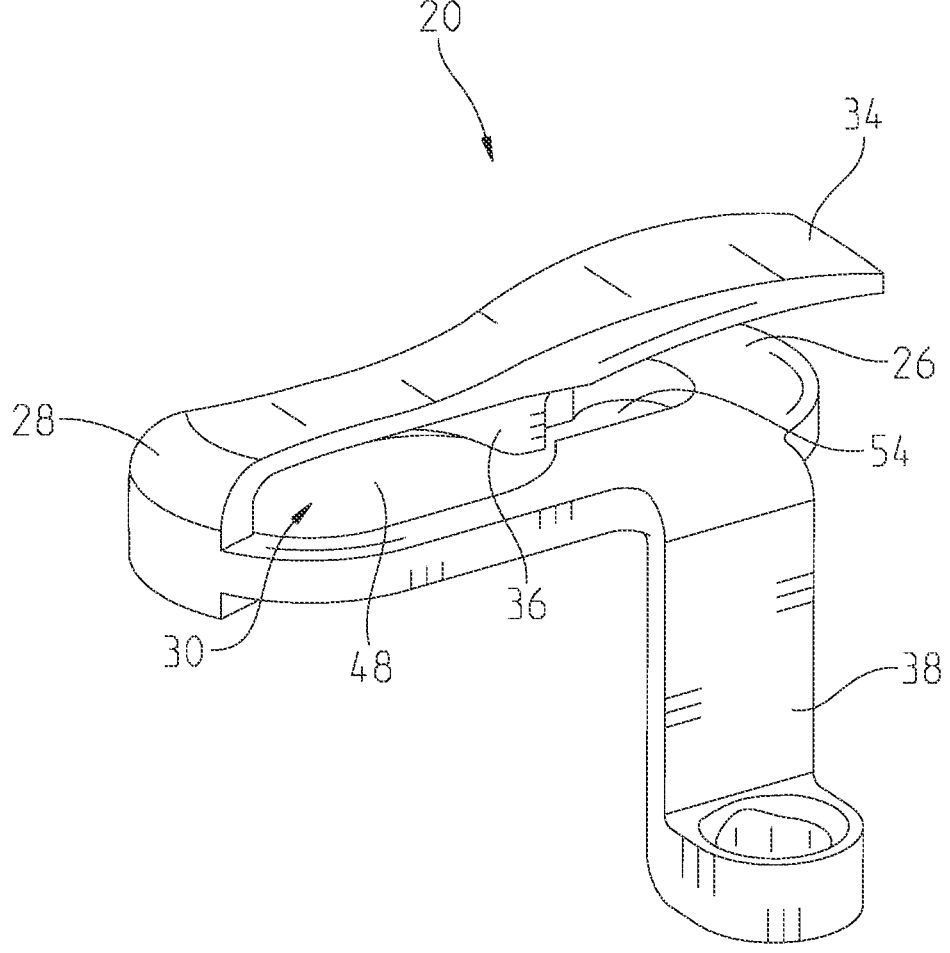
FIG. 8 is a perspective view of a coupler of the present disclosure.

FIG. 8 is a perspective view of coupler 20. Coupler 20 comprises base 26, retainer 28, and accessory support 38. Retainer 28 comprises handle 34 and ridge 36 for retaining protrusion (not shown). As previously described, when in the unlocked position protrusion 32 is within first portion 48 of aperture 30. When in the locked position, protrusion 32 is within second portion 54 of aperture 30 which is smaller than first portion 48. Second portion 54 is shaped for securely holding protrusion 32 to maintain to support the retention of the locked position.

Figure 9:
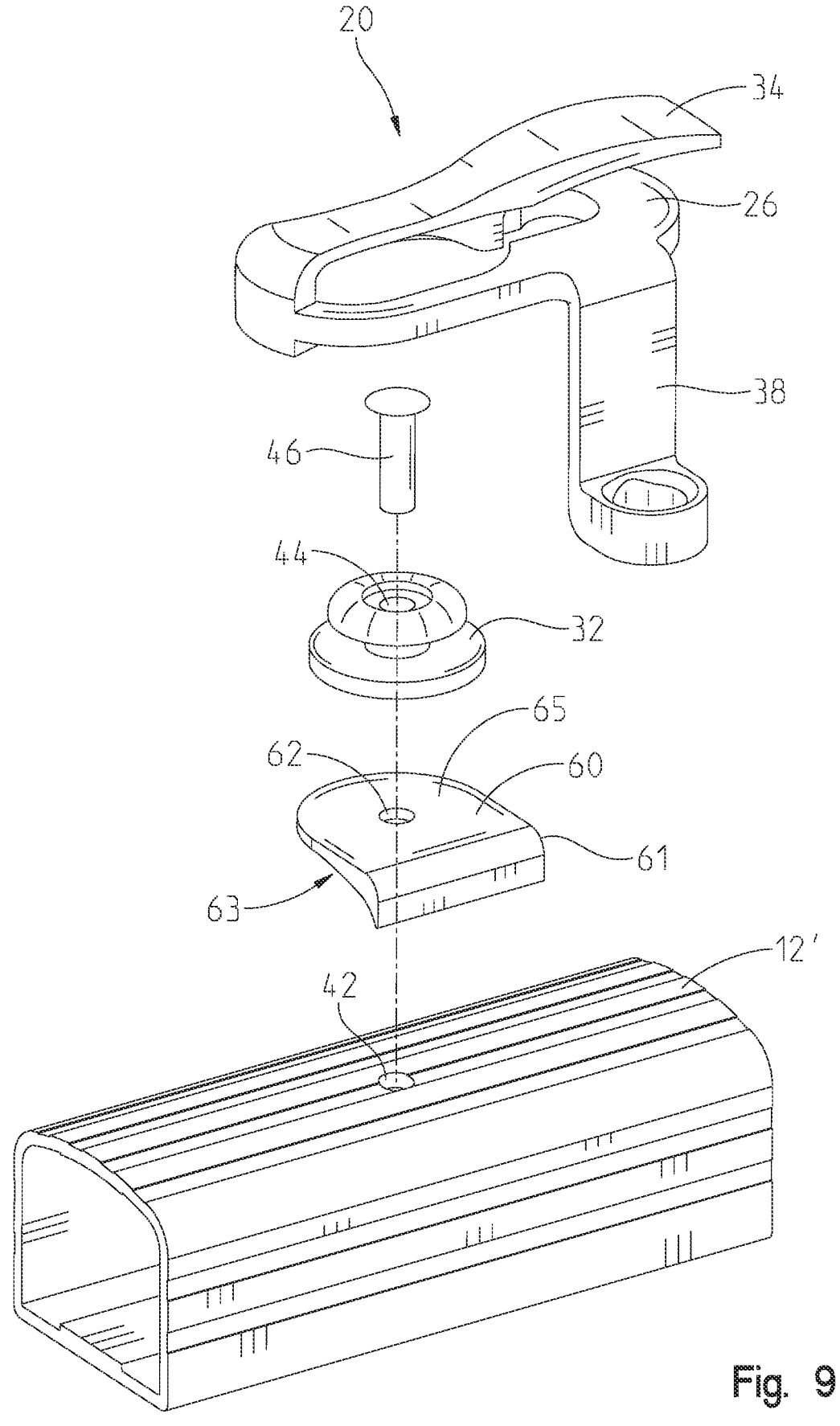
FIG. 9 is an expanded view of a coupler for use with a contoured rail of the present disclosure.

FIG. 9 is an exploded view of coupler 20 positioned above a contoured rail 12'. Coupler 20 comprises base 26, handle 34, and aperture 30 for receiving protrusion 32. Coupler 20 is positioned above contoured rail 12' with an adapter 60 positioned between contoured rail 12' and base 26 of coupler 20. Adapter 60 has a lower side 63 which matches at least a portion of the contour of contoured rail 12' and a top flat side 65. Adapter 60 creates a flat surface above the contoured rail 12' for ease in positioning and securing coupler 20 onto contoured rail 12'. Adapter 60 comprises an opening 62 that aligns with opening 42 of rail 12' and opening 44 of protrusion 32. In the illustrative embodiment of FIG. 9, securing element 46 is used to secure protrusion 32 with adapter 60 and onto contoured rail 12'.

Figures 10, 11:
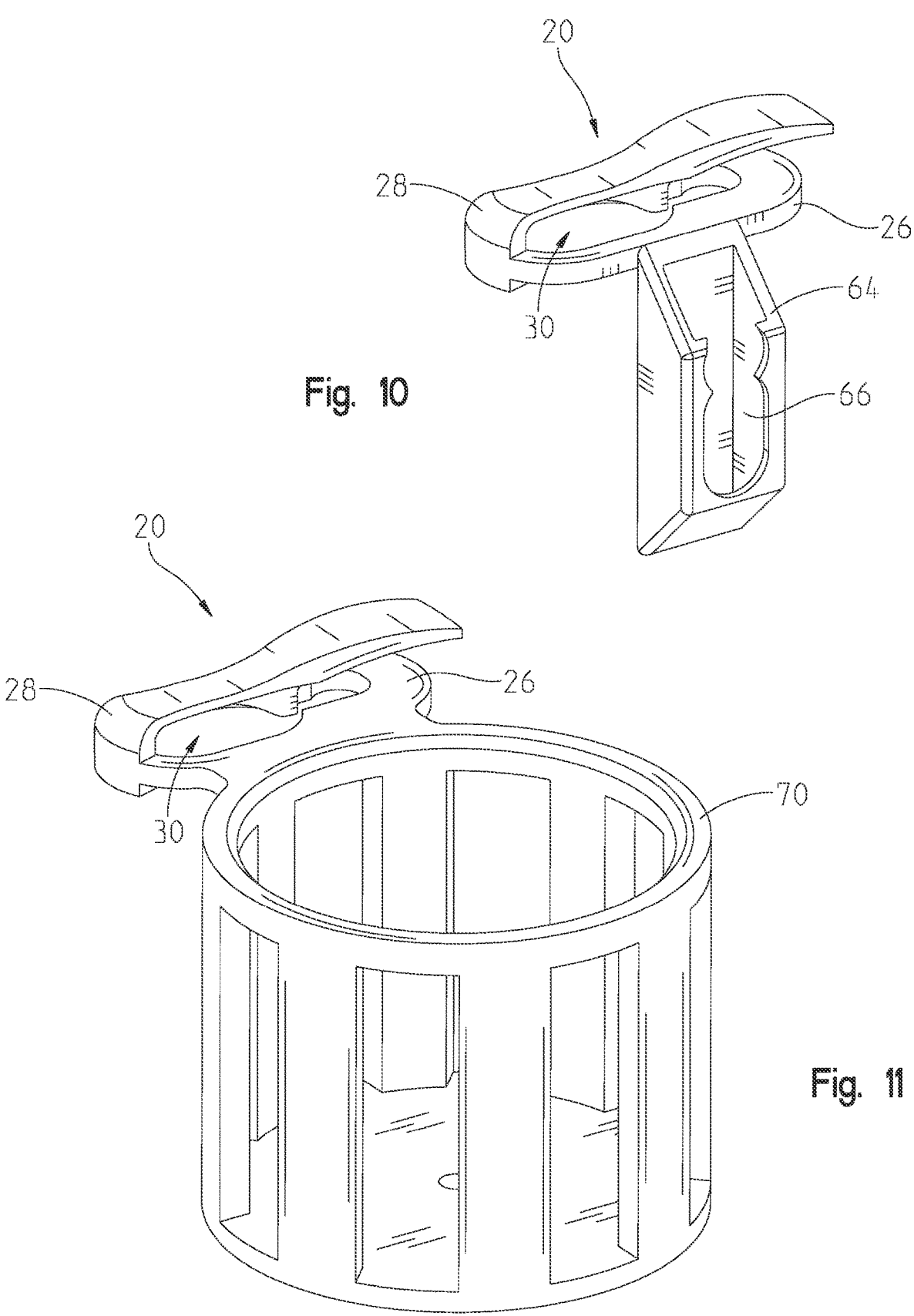
FIG. 10 is a perspective view of an alternative embodiment of a coupler of the present disclosure.
FIG. 11 is a perspective view of an alternate embodiment of a coupler of the present disclosure.

FIG. 10 is a perspective view of an additional embodiment of coupler 20 having a second accessory support 64 instead of accessory support 38. Coupler 20 comprises base 26 having aperture 30 configured for receiving protrusion 32, retainer 28, and second accessory support 64. In this embodiment, second accessory support 64 is an additional example for securing the rope (not shown) to coupler 20. Second accessory support 64 has an opening 66 that receives the rope (not shown) and allows for adjustment thereof.

FIG. 11 is a perspective view of coupler 20 of FIG. 10 with a third accessory support 70. Coupler 20 includes base 26 having aperture 30 configured for receiving protrusion (not shown) and retainer 28. Coupler 20 additionally comprises third accessory support 70. Third accessory support 70 provides an additional alternative attachment for supporting an accessory. In this illustrative embodiment, third accessory support 70 is a cup holder, and the accessory to be supported may be a cup, bottle, glass, or any other suitable item that can be held. In other embodiments, any of accessory support 38, second accessory support 64, and third accessory support 70, may be altered to support an additionally accessory, including but not limited to, a television and various boating accessories. An interface of the accessory support may be designed to mate with a corresponding interface on the accessory in the case of a television or like device.

In the illustrative embodiments of FIG. 10 and FIG. 11, second accessory support 64 and third accessory support 70 may be attached to coupler 20 after accessory support 38 is detached. It is also within the scope of the present disclosure for accessory support 38 to be integrally formed with coupler 20, and thus coupler 20 of FIG. 10 and coupler 20 of FIG. 11 are entirely different embodiments of coupler 20 formed integrally with second and third support assemblies, 64, 70, respectively. Additionally, support assembly 38 could be replaced with an adaptor having the capability of supporting a plurality of accessories.

Figure 12:
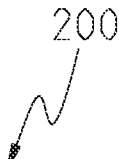
FIG. 12 is a flow chart illustrating a method of use of a coupler of the present disclosure.
Figure 12:
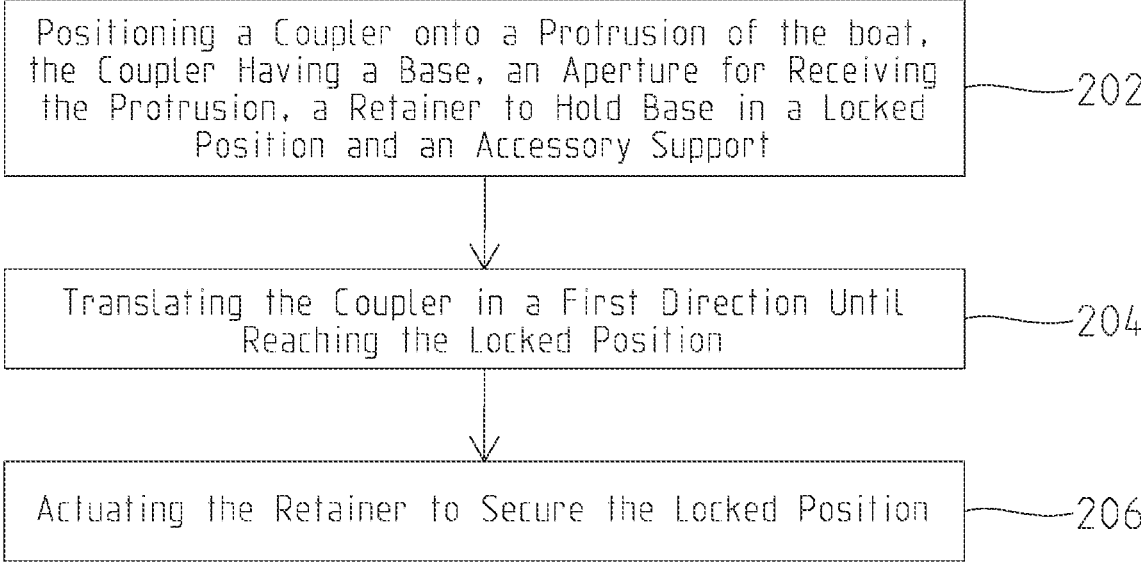

FIG. 12 is a flow chart illustrating a method 200 of using coupler 20 of the present disclosure. While method 200 is described herein with reference primarily to coupler 20 illustrated in FIG. 4 and FIG. 6, method 200 may further be used with reference to at least coupler 20 of FIG. 9. Referring now to FIG. 12, at block 202, method 200 first comprises positioning coupler 20 onto protrusion 32 of boat 10, such as of rail 12. Coupler 20 is positioned such that protrusion 32 is received by first portion 48 of aperture 30, defining the unlocked position of coupler 20, as illustrated in at least FIG. 4. At block 204, method 200 further comprises translating coupler 20 in first direction 100 until coupler 20 reaches the locked position. In embodiments, before the translation occurs, handle 34 of retainer 28 is actuated generally in third direction 104 such that ridge 36 of retainer 28 is positioned above protrusion 32 to allow for translation of coupler 20 without being blocked by protrusion 32. In embodiments, cam surface 90 automatically raises ridge 36 while coupler is translated. The locked position is reached when protrusion 32 is positioned within second portion 54 of aperture 30. In embodiments, post 31 of protrusion 32 engages with base 26, as best illustrated in FIG. 6. Once coupler 20 cannot be translated further, handle 34 can be released in fourth direction (FIG. 7) such that ridge 36 is placed generally adjacent protrusion 32.

At block 206, method 200 further comprises actuating retainer 28 to secure the locked position of coupler 20. This step further comprises releasing handle 34 of retainer 34 such that ridge 36 is positioned adjacent protrusion 32. In some embodiments, method 200 further comprises attaching an accessory to accessory support 38 of coupler 30. In further embodiments, having detachable accessory supports, prior to attaching of an accessory, accessory support 38 is detached and replaced with an alternate accessory support, such as second or third accessory support 64, 70, respectively. In certain instances, the accessory is a fender 22 (FIG. 2). In other instances, coupler 20 comprises third accessory support 64 and the accessory may be a cup.

In additional embodiments, the step of positioning coupler 20 further comprises aligning aperture 30 of base 26 with opening 42 of rail 12. In these embodiments, the step further comprises aligning opening 44 of protrusion 32 with opening 42 of rail 12. Method 200 may then comprise inserting securing element 46 through opening 44 of protrusion 32 and opening 44 of rail 12 to secure protrusion 32 in position.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A coupler comprising:
   a base having an opening adapted to receive a protrusion extending outward from a portion of a boat, the base having a locked position and an unlocked position, the base being translatable along a first direction between the unlocked position and the locked position;

wherein the portion of the boat includes a rail supported on a horizontally extending deck and the rail is horizontally located between an edge of the horizontally extending deck and furniture supported on the horizontally extending deck;
   a retainer having:
      a ridge with a cam surface;
         wherein, upon contact with the protrusion, the cam surface is configured to actuate the retainer with translation of the base along the first direction; and
         wherein the ridge is configured to hold the base in the locked position;
   an accessory support extending outward from the base in a second direction angled relative to the first direction; and
   an adapter position between the base and the rail.

2. The coupler of claim 1, wherein the portion of the boat has a longitudinal axis and the first direction is parallel to the longitudinal axis.

3. The coupler of claim 1, wherein the accessory support includes a receiver which is adapted to retain an accessory.

4. The coupler of claim 3, wherein the accessory is a fender.

5. The coupler of claim 1, wherein the retainer includes a handle and the ridge for securing the base in the locked position.

6. The coupler of claim 1, wherein the retainer is hinged relative to the base of the coupler.

7. The coupler of claim 1, wherein the second direction is angled relative to the first direction in a horizontal plane.

8. The coupler of claim 7, wherein the second direction is perpendicular to the first direction.

9. The coupler of claim 1, wherein the opening of the base includes a first portion and a second portion, the first portion being larger than the second portion.

10. The coupler of claim 1, wherein the base and the retainer are integrally formed.

11. A method of supporting an accessory, the method comprising:
    positioning a coupler onto a protrusion of a boat, the coupler including:
       a base moveable between a locked position relative to a rail and an unlocked position relative to the rail;
       a retainer configured to hold the base in the locked position; and
       an accessory support;
    moving the coupler in a first direction to position the base in the locked position relative to the rail; and
    positioning the base in the locked position includes:
       contacting the protrusion with the retainer; and
       actuating the retainer of the coupler with a cam surface of the retainer to secure the locked position.

12. The method of claim 11, wherein the step of moving the coupler includes translating the coupler in the first direction.

13. The method of claim 11, wherein the protrusion is coupled to the rail of the boat, the rail positioned adjacent to at least one piece of furniture.

14. The method of claim 13, wherein the movement of the coupler to position the base in the locked position relative to the rail without the coupler contacting the at least one piece of furniture.

15. The method of claim 11, wherein positioning the coupler onto the protrusion includes receiving the protrusion in an aperture.

16. The method of claim 15, wherein the aperture is included in the base, and positioning the coupler includes aligning the aperture with an opening of the rail and an opening of the protrusion.

17. The method of claim 16, where after positioning of the coupler onto the protrusion and aligning the aperture with the opening of the rail, the method includes inserting a securing element through the protrusion and through the opening of the rail.

18. The method of claim 11, including attaching an accessory to the accessory support of the coupler.

19. The method of claim 11, wherein prior to attaching an accessory, the accessory support is removed and replaced with an alternate accessory support.

20. The method of claim 11, wherein the retainer includes a handle hinged relative to the base.

21. The method of claim 20, wherein before translating the coupler, the method comprises moving the handle in a third direction to allow movement of the coupler.

* * * * *